United States Patent

Hendrickson

[15] 3,653,683
[45] Apr. 4, 1972

[54] VEHICLE SUSPENSION SYSTEM

[72] Inventor: Robert T. Hendrickson, Lyons, Ill.

[73] Assignee: Hendrickson Mfg. Co., Lyons, Ill.

[22] Filed: May 18, 1970

[21] Appl. No.: 38,385

[52] U.S. Cl. .........................................280/124 F, 267/15 R
[51] Int. Cl. ...........................................................B60g 11/26
[58] Field of Search........................267/15 R, 15 A; 280/124

[56] References Cited

UNITED STATES PATENTS

| | | | |
|---|---|---|---|
| 3,361,445 | 1/1968 | Harbers | 280/124 |
| 3,049,359 | 8/1962 | Geyer | 280/124 |

*Primary Examiner*—Philip Goodman
*Attorney*—Greist, Lockwood, Greenawalt & Dewey

[57] ABSTRACT

A vehicle axle suspension which may be employed in a single or multiple axle arrangement and which is characterized by a rigid elongate mounting arm disposed at each side of the vehicle frame with its forward end pivoted to a bracket depending from the frame and its trailing end connected to the wheel axle beneath an air cushion which is interposed between the axle and the frame and a snubber-like force absorbing device connecting an intermediate portion of the mounting arm with the frame at a point spaced rearwardly of the pivoted end of the mounting arm.

9 Claims, 6 Drawing Figures

PATENTED APR 4 1972 3,653,683

INVENTOR
ROBERT T. HENDRICKSON
BY Dreist, Lockwood, Greenawalt & Dewey
ATT'YS.

INVENTOR
ROBERT T. HENDRICKSON
BY [signature]
ATT'YS

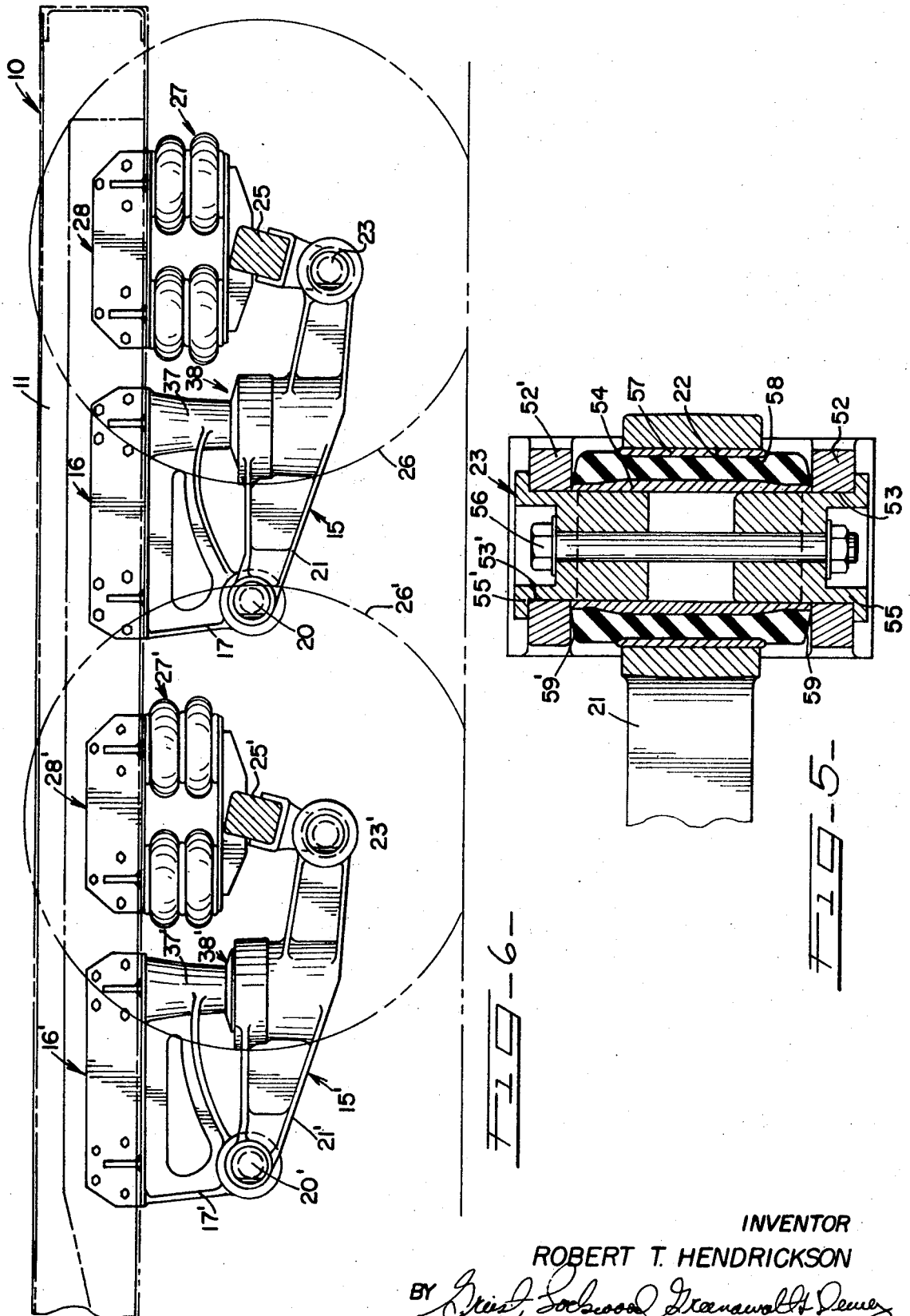

VEHICLE SUSPENSION SYSTEM

This invention relates generally to wheel supported vehicles and is more particularly concerned with innovations and improvements in apparatus for providing a resilient suspension system connecting the vehicle frame and a wheel axle or axles.

Various suspension systems have been provided heretofore for connecting a vehicle frame to wheel axle assemblies so as to provide a satisfactory support fro the vehicle under various operating conditions. Systems have been devised for supporting the vehicle and its load under static or moving conditions wherein the axle assemblies are connected to rigid arm members which in turn have had some form of resilient connection with the vehicle frame. One form of resilient suspension system of this type is disclosed in my U.S. Pat. No. 2,689,136, dated Sept. 14, 1954 and U.S. Pat. No. 3,297,339 dated Jan. 10, 1967, in which tandem axles are connected to opposite ends of rigid walking beams which have a pivotal connection intermediate their ends with brackets resiliently mounted in depending relation on the vehicle side frame members. Another form of resilient suspension is disclosed in my U.S. Pat. No. 3,130,952, dated Feb. 11, 1964 which employs cantilever beam members for supporting a single axle assembly. While these suspensions are satisfactory for the purposes for which the respective systems have been designed, there has not been available a rigid arm suspension system which may be employed in a single axle arrangement and by duplication of the single axle arrangement provide a satisfactory multiple axle arrangement.

It is a general object of the invention to provide a resilient suspension system for supporting a vehicle frame on one or more wheel axles wherein a novel suspension unit is employed for each axle which unit is so constructed that it may be satisfactorily employed for a single axle suspension or by duplication for tandem or other multiple axle suspension arrangements.

It is a more specific object of the invention to provide a vehicle suspension employing a rigid cantilever arm which is connected at its forward end to the vehicle frame and at the rearward end to an axle with limited movement of the arm permitted by an air cushion interposed between the wheel axle and the vehicle frame and a force absorbing device which functions as a snubber connecting the arm at a point intermediate its ends with the vehicle frame.

A still more specific object of the invention is to provide a vehicle suspension wherein an axle is mounted on the ends of elongate cantilever arms having their leading ends pivotally connected to brackets depending from the vehicle side frame members with air cushions interposed between the axles and the frame member and with force absorbing devices connecting the frame members and intermediate portions of the cantilever arms which devices are operative as snubbers when the air cushions are extended and which also absorb side sway forces and support rebound.

Another object of the invention is to provide a vehicle suspension which employs cantilever arms disposed at opposite sides of the vehicle frame which arms are pivotally mounted at their forward ends on brackets depending from the side frame members and extend rearwardly along the same with their rearward ends pivotally connected to brackets depending from an axle assembly below air spring members connecting the axle assembly to the frame, the arms being connected intermediate their ends to the overlying frame by a force absorbing device whereby the arms tend to pull the frame down when the wheels go over a bump thereby minimizing bouncing.

These and other objects and advantages of the invention will be apparent from a consideration of the vehicle suspension system which is shown by way of illustration in the accompanying drawings wherein:

FIG. 5 is a cross section taken on the line 5—5 of FIG. 1, to an enlarged scale; and FIG. 6 is a side elevation illustrating a multiple axle suspension system embodying the invention.

Figure 1:
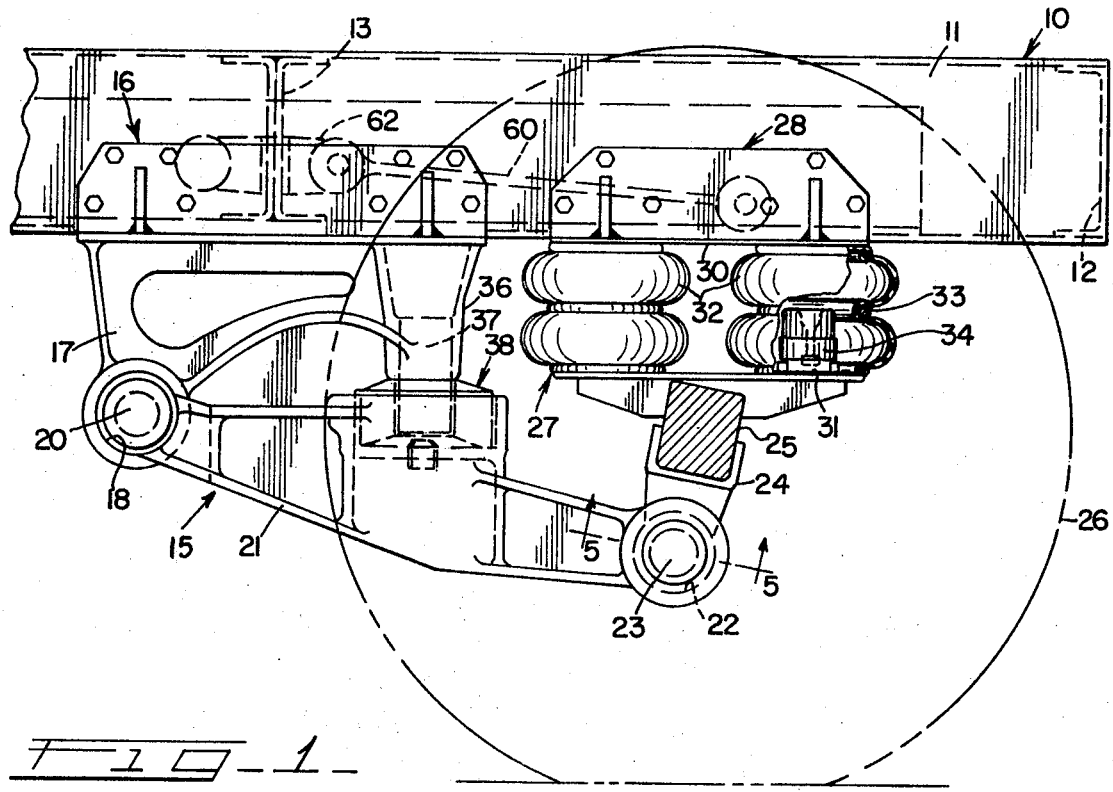
FIG. 1 is an elevational view, with portions broken away, at one side of a vehicle frame showing a suspension system for a single wheel axle assembly which embodies the principal features of the invention.

Referring to FIGS. 1 to 4, there is illustrated a rear portion of a wheel supported vehicle frame 10 which comprises laterally spaced, parallel side frame members in the form of channels 11, an end cross channel 12 connecting the ends of the side frame members 11 and an intermediate double channel, reinforcing cross frame member 13. A single axle suspension arrangement extends beneath the vehicle frame 10 with a connection to each side frame member 11. The connecting structure 15 is duplicated at each side of the frame 11 and only one such connecting structure or suspension arrangement 15 will be described.

The suspension assembly or arrangement 15 at each side of the frame 11 comprises a bracket 16, which may be a metal casting, and which is rigidly attached by bolts or other fasteners to the outside and bottom faces of the vehicle side frame channel 11. The bracket 16 has a depending portion 17 extending in the direction forwardly of the vehicle frame 11, with a pivot bearing 18 for accommodating a pivot pin assembly 20 which connects thereto the leading or forward end of an elongate rigid cantilever arm 21. The cantilever arm 21 extends rearwardly of the pivot 20 and has a pivot bearing 22 at the rear end for receiving a pivot pin assembly 23 in the inverted U-shaped bracket 24 which connects thereto the axle assembly 25, the latter having its end extended to receive a pair of wheels 26.

The axle assembly 25 which extends transversely of the frame 10 is connected to the side frame member 11 above the pivot 23 by means of an air cushion or air spring assembly 27 and a bracket 28, with the latter being spaced rearwardly of the bracket 16. Various forms or styles of air cushion assemblies may be employed. In the form of air cushion 27 which is illustrated, top and bottom plates 30 and 31 are separated by a pair of air bags 32 of rubber-like material which constitute air ride or air spring members, each having a girdle hoop 33 dividing it into two sections and encompassing a bumper member 34 of rubber or other resilient material extending upwardly of the bottom plate 31 which limits the compression of the spring forming member 32. The top plate 30 is connected to the bracket 28 which is of inverted T-shaped cross section and which is bolted or otherwise secured to the outside and bottom faces of the side frame member 11. The bottom plate 31 is connected in a suitable manner to the top of the axle housing 25. A tank valve (not shown) is provided for entrance of air into the member 32.

The forward bracket 16 extends rearwardly and has a depending rear portion 36 forming a cylindrical housing for a depending pin 37, the upper end of which extends into the housing, with the lower end extending below the bracket portion 36. A resilient stress-absorbing assembly 38 is carried on the extended lower end of the pin 37, which is seated in a cylindrical recess 40 provided in the beam member 21 intermediate the ends thereof. The stress-absorbing unit or assembly 38, in the form illustrated, is composed of two concentrically arranged sleeve members 41 and 42, of metal or other rigid material, between the confronting faces of which there is provided a cylindrical bushing 43, of rubber or other resilient material, the inner and outer faces of which are bonded to the confronting faces of the rigid sleeve members 41 and 42. The inner sleeve member 41 is mounted on the end of the pin 37 and the assembly 38 is retained thereon by a washer forming member 44 secured by a nut 45 on a threaded stud formation 46 which is rigidly secured in the lower end of the tubular member which constitutes the pin 37. The outer sleeve 42 is seated in the recess 40 and the assembly 38 is held in the recess by clamp members 47 mounted on studs 48 which are spaced about the periphery of the recess 40 and engage a clamping washer 50. The washer 50 forms an inwardly directed flange on the top edge of the outer sleeve 42 with the inner margins overlying the resilient bushing 43. The width and shape of the washer margin may be varied to vary the contact with the upper face of the resilient bushing 43 and thus limit the upward movement of the latter. In like manner, the bottom washer 44 may have its marginal portions varied to limit the movement of the bushing 43 in the downward direction. Thus, variations in the ride or snubbing action of the assembly 38 may be had.

The pivot assemblies 20 and 23 at opposite ends of the cantilever arm 21 may take the form illustrated in FIG. 5, or any similar form which will permit some limited movement or twisting action between the machines. In the form illustrated in FIG. 5, the parallel plate-like legs 52 and 52' of the bracket 24 have aligned apertures or bores 53 and 53' in which the pivot assembly 23 is mounted. The pivot assembly or bushing 23 comprises a cylindrical inner metal sleeve 54 which is clamped in position between the bores 53 and 53' in the legs 52 and 52' and receives the inner ends of flanged plug members 55 and 55' which are connected by a bolt 56. An outer cylindrical metal sleeve 57 is seated in the bearing recess 22 in the end of the arm member 21 and a cushion forming cylindrical sleeve 58 of rubber or other rubber-like material is interposed between the inner and outer sleeve members 54 and 57 and bonded thereto. The arm member 21 and the outer sleeve 57 are of lesser dimensions in the direction of the axis of the inner sleeve member 54 than the corresponding dimension of the latter and the outer end faces of the rubber sleeve 58 are tapered inwardly at 59 and 59' which permits a limited amount of twisting movement between the arm 21 and bracket 24.

Figure 2:
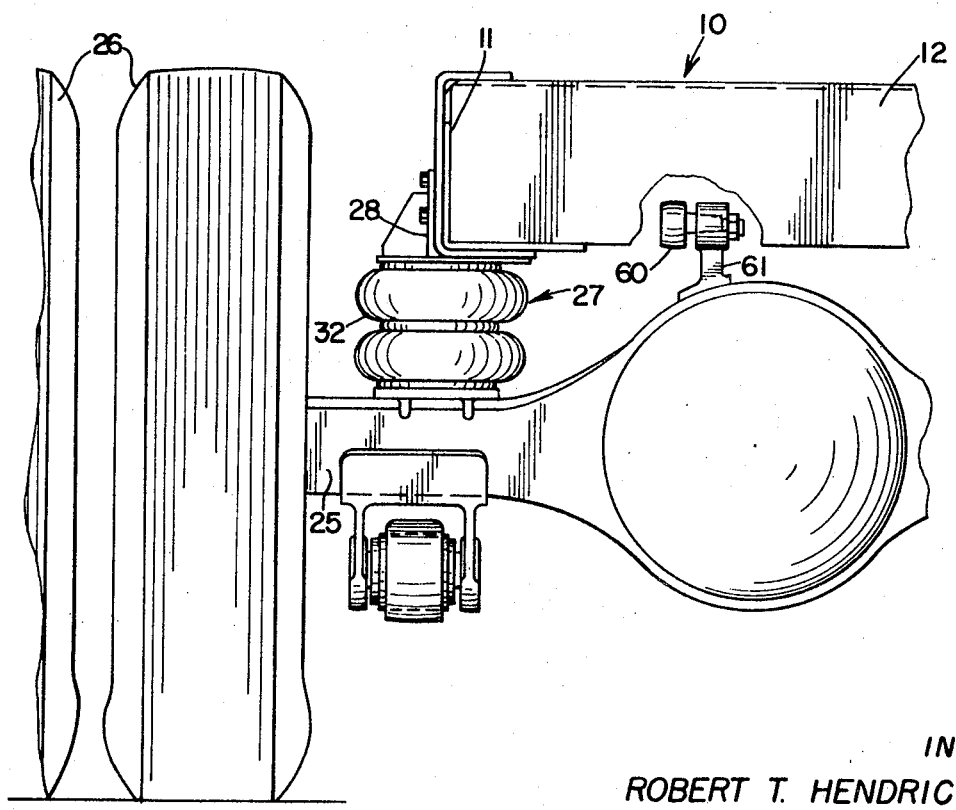
FIG. 2 is a partial rear elevation showing the suspension system of FIG. 1.
Figure 3:
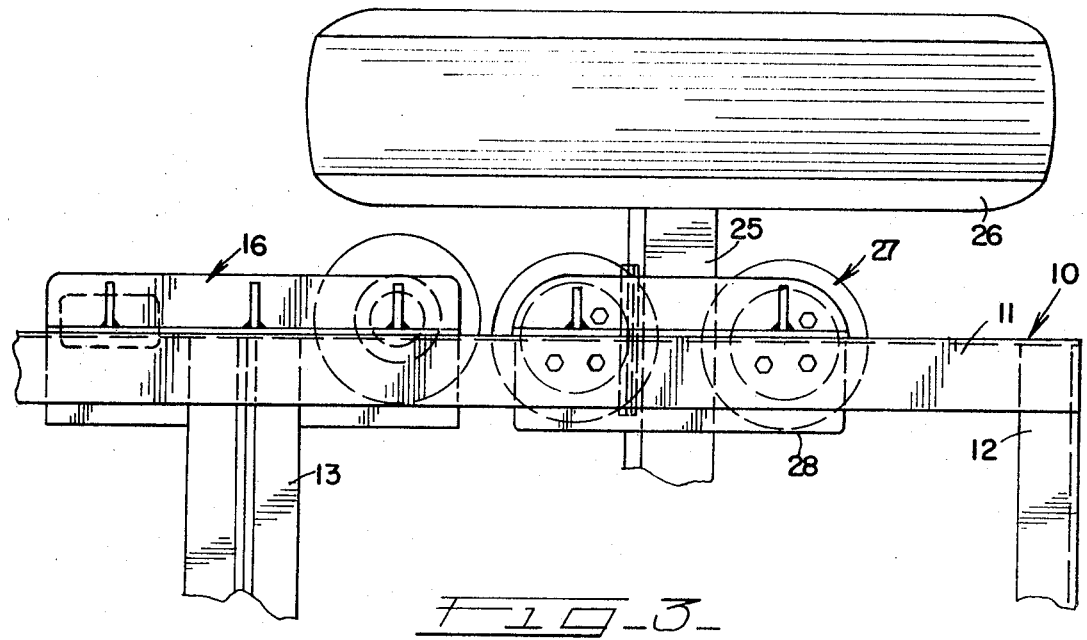
FIG. 3 is a partial plan view showing the suspension system of FIG. 1.
Figure 4:
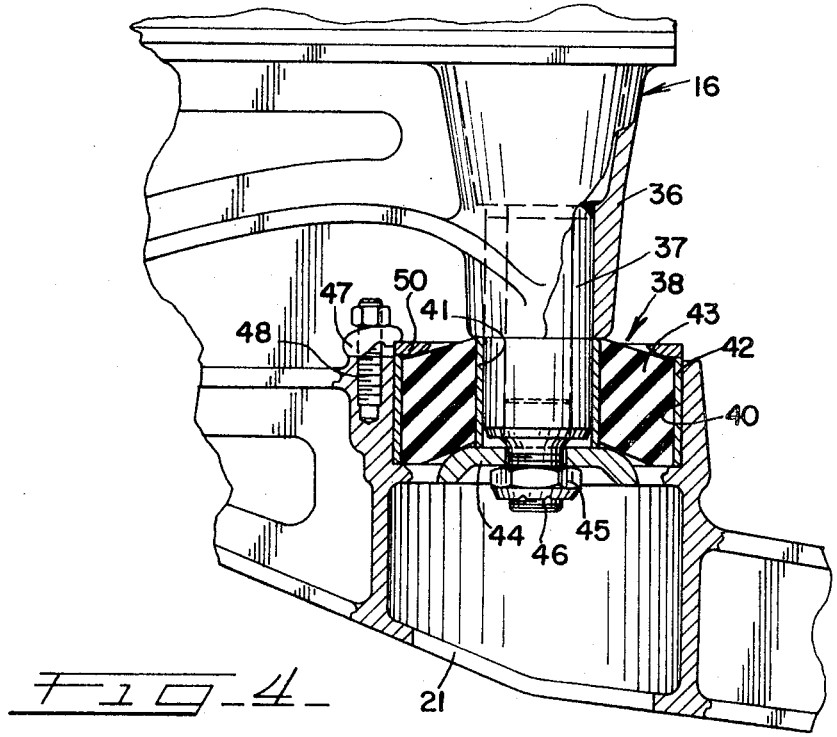
FIG. 4 is an enlarged view with portions broken away of the force absorbing device which connects the pivoted arm at a point intermediate its ends to the vehicle frame.

The air cushion or air spring assembly 27 permits limited vertical movement in response to vertical forces due to weight and load and the pin carried assembly 38 acts as a snubber. It also acts to absorb stresses due to side-sway. The arrangement eliminates any need for radius or torque rods or other bracing against side-sway. The usual torque rod 60 for countering any tendency of the axle assembly 25 to rotate about its transverse axis may be connected at one end to the axle housing at 61 and at the other end to the cross frame member 13 at 62 as shown in FIGS. 1 and 2.

A tandem suspension is shown in FIG. 6 which illustrates the employment of the invention in producing a multiple axle suspension system. In the illustrated arrangement, two single axle suspension 15 and 15' are employed for supporting the vehicle frame 10 on the parallel axles 25 and 25'. The rearmost axle 25 carrying wheels 26 is connected to the frame side channels 11 by the suspension 15 while the forward axle 25' carrying wheels 26' is connected to a portion of the frame 10 at points spaced forwardly of the suspension 15'. The axle 15 is attached to the ends of the cantilever arms 21 by a pivot bearings 23, the other ends of the arms 21 being connected by pivot bearings 20 to depending portions 17 of the mounting brackets 16 which are fixed on the side frame channels 11. An air cushion or air spring 27 is interposed between the axle 25 and a mounting bracket 28 on each side frame member 11 while a force absorbing device 38 on the bottom of a pin 37 depending from each bracket 16 is connected to the midpoint of each of the cantilever arms. The suspension 15' duplicates the suspension 15 and like parts are indicated by the same numbers primed. The mounting brackets 16' and 28' are secured to the side frame members 11 at points spaced forwardly of the corresponding mounting brackets 16 and 28 as shown and center torque bars (not shown) may be employed to resist rotation of the axles 25 and 25'.

I claim:

1. A resilient axle suspension interposed between each side of a vehicle frame and the transversely extending axle of a wheel support means therefor comprising an elongate rigid arm member disposed beneath the frame side member and extending longitudinally of the vehicle, a mounting bracket for said arm member having a depending portion at the forward end thereof and pivot means connecting the forward end of said rigid arm member to said depending forward end portion of said mounting bracket so as to permit vertical swinging movement of said rigid arm member, pivot forming means at the other end of said arm member, a bracket depending from said transversely extending axle and connected to said arm member by said pivot forming means at the other end of said arm member, an air cushion mounted between said transversely extending axle and said vehicle frame and a stress absorbing device connecting said arm member at a point intermediate its ends with the vehicle frame at the trailing end of the mounting bracket for said arm member which stress absorbing device acts as a snubber when the air cushion is extended.

2. An axle suspension as set forth in claim 1 and said stress absorbing device comprising a pin depending from said frame side member with the bottom end thereof connected to said arm member by a resilient sleeve bushing which permits limited swinging movement of said arm member in a vertical direction.

3. An axle suspension as set forth in claim 1 and said stress absorbing device comprising a rigid pin depending from a rearward portion of said mounting bracket and a resilient bushing on said pin which is seated in a recess in said arm member and which permits limited swinging movement of said arm member.

4. An axle suspension as set forth in claim 1 and said pivot means at the end of said arm member including a resilient bushing.

5. A resilient axle suspension structure for a vehicle having a frame with parallel side beams and a wheel support means having a transversely extending axle, said suspension structure comprising an elongate rigid arm member disposed beneath each frame side beam and extending longitudinally of the vehicle, a mounting bracket for each said arm member at the forward end thereof and pivot means connecting the forward end of said arm member to said mounting bracket so as to permit vertical swinging movement of said arm member, pivot means at the other end of said arm member connecting said arm member to said transversely extending axle, a cushion forming means comprising a resilient compressible air member mounted between said transversely extending axle and said vehicle frame, and means including a stress absorbing device connecting said arm member at a point intermediate its ends with the frame side beam which acts as a snubber when the cushion forming means is extended.

6. A resilient axle suspension structure as set forth in claim 5 wherein said cushion forming means comprises an air spring member.

7. A resilient suspension unit for single or multiple axle support of a vehicle frame, said suspension unit comprising an elongate rigid arm member disposed beneath the vehicle frame at each side thereof and extending longitudinally of the vehicle, a mounting bracket for said arm member depending below said vehicle frame, pivot means connecting the forward end of said arm member to said depending mounting bracket so as to permit vertical swinging movement of said arm member, pivot means at the other end of said arm member connecting said arm member to a transversely extending axle, said pivot means at the opposite ends of said arm member having a resilient member so as to permit limited twisting movement, means forming a cushion member mounted between said transversely extending axle and said vehicle frame and a stress absorbing device connecting said arm member at a point intermediate its ends with the overlying vehicle frame which device acts as a snubber for the cushion member.

8. A resilient suspension unit for single or multiple axle support of a vehicle frame, said suspension unit comprising an elongate rigid arm member disposed beneath the vehicle frame at each side thereof and extending longitudinally of the vehicle, a mounting bracket for said arm member depending below said vehicle frame, pivot means connecting the forward end of said arm member to said depending mounting bracket so as to permit vertical swinging movement of said arm member, pivot means at the other end of said arm member connecting said arm member to a transversely extending axle, means forming a cushion member mounted between said transversely extending axle and said vehicle frame and a stress absorbing device connecting said arm member at a point intermediate its ends with the overlying vehicle frame, said stress absorbing device comprising a rigid pin depending from said frame and a resilient connection between the lowermost end of said pin and said arm member which resilient connection includes a resilient sleeve secured on the end of said pin, said arm member having a socket for receiving said resilient sleeve, and means for securing said resilient sleeve in said socket which permits limited vertical movement of said pin end and enables side sway to be absorbed by said resilient sleeve while acting as a snubber for limiting the movement of said arm member when said cushion member is extended.

9. A resilient axle suspension structure for a vehicle having a frame with parallel side beams and a wheel support means having a transversely extending axle, said suspension structure comprising an elongate rigid arm member disposed beneath each frame side beam and extending longitudinally of the vehicle, a mounting bracket for each said arm member at the forward end thereof and pivot means connecting the forward end of said arm member to said forward mounting bracket so as to permit vertical swinging movement of said arm member, pivot means at the other end of said arm member connecting said arm member to said transversely extending axle, a cushion forming means mounted between said transversely extending axle and said vehicle frame and a stress absorbing device in the form of a rigid pin depending from said vehicle frame which pin extends into a cooperating socket formation in said arm member at a point intermediate its ends with a resilient sleeve bushing connection so as to act as a snubber when the cushion forming means is extended.

* * * * *